United States Patent [19]

Petersen

[11] 4,010,309
[45] Mar. 1, 1977

[54] WELDING ELECTRODE

[75] Inventor: Walter Adrian Petersen, Ridgewood, N.J.

[73] Assignee: The International Nickel Company, Inc., New York, N.Y.

[22] Filed: Oct. 30, 1975

[21] Appl. No.: 627,238

Related U.S. Application Data

[63] Continuation-in-part of Ser. No. 477,900, June 10, 1974, abandoned, which is a continuation-in-part of Ser. No. 386,488, Aug. 8, 1973, abandoned.

[52] U.S. Cl. .............................. 428/386; 428/385; 428/387; 427/59; 427/61; 148/23; 148/25; 148/26; 219/145; 219/146
[51] Int. Cl.$^2$ .................. B32B 15/00; B23K 35/34
[58] Field of Search .............. 148/23, 25, 26; 219/145, 146; 428/385, 386, 387; 427/59, 61

[56] References Cited

UNITED STATES PATENTS

| 2,121,770 | 6/1938 | Chadwick | 148/24 |
| 2,520,806 | 8/1950 | Kihlgren | 427/59 |
| 3,024,137 | 3/1962 | Witherell | 427/59 |
| 3,184,345 | 5/1965 | Kerekes | 148/26 |
| 3,208,886 | 9/1965 | Reilley | 148/26 |
| 3,235,405 | 2/1966 | Quaas | 148/26 |
| 3,571,553 | 3/1971 | Godai | 219/73 |
| 3,645,782 | 2/1972 | Johnson | 148/26 |

FOREIGN PATENTS OR APPLICATIONS

| 798,153 | 7/1958 | United Kingdom | 428/385 |
| 921,067 | 3/1963 | United Kingdom | 428/385 |
| 944,800 | 12/1963 | United Kingdom | 428/385 |

*Primary Examiner*—Michael F. Esposito
*Attorney, Agent, or Firm*—Walter A. Petersen; Ewan C. MacQueen; Raymond J. Kenny

[57] ABSTRACT

Directed to a welding flux and covered welding electrodes, and, more particularly, to covered electrodes having a nickel-chromium-iron alloy core and a special flux coating or covering, which electrode is capable of joining similar and dissimilar metals and which produces, in all positions, sound welds free from cracking and porosity and deposits having excellent corrosion resistance.

17 Claims, No Drawings

WELDING ELECTRODE

The present invention is a continuation-in-part of application Ser. No. 477,900, filed June 10, 1974 now abandoned, which is a continuation-in-part of application Ser. No. 386,488, filed Aug. 8, 1973 now abandoned. The present invention relates to covered electrodes, and, more particularly, to covered electrodes having a nickel-chromium-iron alloy core and a special flux coating or covering, which electrode is capable of joining similar and dissimilar metals and which produces, in all positions, sound welds free from cracking and porosity and deposits having excellent corrosion resistance.

There is a need in the art for welding electrodes capable of welding corrosion-resistant nickel-base alloys such as a nickel-base alloy comprising nominally 28% chromium- 10% iron. This alloy has a demonstrated capability for use in corrosion-resistant piping systems and it is recognized that welding electrodes having the capabilities of meeting a wide range of criteria are needed to promote commercial utilization of the aforementioned alloy for many such applications. The welding electrode should afford excellent operating characteristics in all welding positions and produce sound welds free from cracking and porosity when made under heavy restraint. The covered electrode should also produce a weld deposit having corrosion resistance equivalent to that of the base alloy and have a tolerance for iron dilution for making dissimilar joints and for overlaying other alloys, e.g., steel.

It has now been discovered that sound welds, which are free from cracking and porosity, and which have corrosion resistance equivalent to that of the aforementioned 28% chromium- 10% iron, balance nickel alloy can be made in all welding positions by employing a specially coated nickel-chromium-iron alloy electrode.

An object of the invention is to provide a coated welding electrode which has a nickel-base alloy core wire and a special flux coating containing, in novel combination, special proportions of ingredients, said electrode having a tolerance for iron dilution making it suitable for joining dissimilar metals and for overlaying iron-base alloys as well as having good operatiblity and the capability of providing highly corrosion-resistant weld deposits.

The invention also contemplates providing a flux coating for use in arc welding.

Other objects and advantages will become apparent from the following description.

Generally speaking, the present invention contemplates a coated welding electrode having a nickel-base alloy core wire and a flux coating or covering, the preferred relative proportioning of core metal and flux coating being described hereinbelow in Table I.

In general, the core wire contains, in percent by weight, up to about 0.1% carbon, up to about 2.5% manganese, up to about 2.5% silicon, from about 14% to about 32% chromium, up to about 5% aluminum, up to about 5% titanium, up to about 25% iron, up to about 1% tantalum, up to about 2% columbium, and the balance essentially nickel.

As will be understood by those skilled in the art, the use of the expression "balance essentially" does not exclude the presence of other elements commonly present as incidental elements, e.g., the oxidizing and cleansing aid elements, and impurities normally associated therewith in small amounts which do not adversely affect the novel characteristics of the alloys.

The flux coating contemplated by the present invention contains,, in percent by weight of the dry flux, a mixture comprising from about 10% to about 26% calcium carbonate, from about 5% to about 20% barium carbonate, from about 10% to about 23% titanium dioxide, up to about 4% aluminum oxide (alumina), up to about 2% chromium oxide, from about 24% to about 26% cryolite, from about 10% to about 18% manganese, from about 1.8%, advantageously at least 2.4%, to about 7.2% columbium, up to about 7.2% molybdenum, and up to about 10% chromium.

In carrying the invention into practice, preferred embodiments are desirably employed for specific applications. Illustrative core wire and flux compositions of welding electrodes particularly suitable for welding nickel-base alloys comprising nominally 28% chromium-10% iron are shown hereinbelow in Tables A and B, respectively.

TABLE A

|  | C | Mn | Si | Cr | Ti | Al | Fe | Ni |
|---|---|---|---|---|---|---|---|---|
| Broad | UT 0.1 | UT 2 | UT 2.5 | 24–32 | UT 5 | UT 5 | UT 25 | Bal* |
| Preferred: | UT 0.05 | UT 1 | UT 1 | 27–31 | UT 1 | UT 1 | 8–12 | Bal** |

\* = In an amount from about 50% to about 67%
\*\* = In an amount from about 52% to about 65%
UT = Up To

TABLE B

|  | CaCO$_3$ | BaCO$_3$ | TiO$_2$ | Al$_2$O$_3$ | Cryolite | Mn | Cb | Cr |
|---|---|---|---|---|---|---|---|---|
| Broad | 12–20 | 12–20 | 12–20 | 1–2 | 24–26 | 13–16 | 4.8–6 | UT 6 |
| Preferred: | 15 | 15 | 15 | 1 | 24–26 | 13–16 | 4.8–6 | UT 6 |

Note: +3% Bentonite extrusion aid and 15% sodium silicate binder

An illustrative example of core wire and flux compositions of welding electrodes particularly suitabe for the welding of austenitic and ferritic steels to each other and to high nickel alloys are shown hereinbelow in Tables C and D, respectively.

TABLE C

|  | C | Mn | Si | Cr | Ti | Al | Fe | Ni | Cb | Ta |
|---|---|---|---|---|---|---|---|---|---|---|
| Broad | UT 0.1 | UT 2.5 | UT 2.5 | 14–18 | UT 5 | UT 5 | UT 25 | Bal | UT 2* | UT 1* |

TABLE C-continued

| | C | Mn | Si | Cr | Ti | Al | Fe | Ni | Cb | Ta |
|---|---|---|---|---|---|---|---|---|---|---|
| Preferred: | UT .05 | UT 1 | UT 1 | 15–17 | UT 1 | UT 1 | 6–8 | Bal | UT 1.5* | UT 0.5* |

*Cb + Ta = 1.5–3.0

TABLE D

| | CaCO$_3$ | BaCO$_3$ | TiO$_2$ | Al$_2$O$_3$ | Cryolite | Mn | Cb | Cr$_2$O$_3$ | Mo | Cr |
|---|---|---|---|---|---|---|---|---|---|---|
| Broad | 12–20 | 12–20 | 12–20 | 1–2 | 24–26 | 4–8 | 1.8–6 | 1–2 | 1.8–6 | 1–6 |
| Preferred | 17 | 16 | 16 | 1 | 25 | 7 | 5.4 | 1 | 3 | 3 |

Note: +3% Bentonite extrusion aid and 15% sodium silicate binder

It is essential that all of the foregoing flux ingredients be present in the amounts specified in order to provide coated electrodes suitable for producing sound joints which are free from cracking and porosity and which provide excellent operating characteristics in all welding positions.

If the amount of calcium carbonate in the flux coating is less than about 10%, the arc becomes somewhat unstable but, more importantly, the slag removal quality becomes very poor due to an increase in tenacity of the slag. Above about 26% calcium carbonate, slag removal again becomes a problem and the melting point of the slag increases leaving a portion of the coating unmelted at the electrode tip (usually in the shape of a "fingernail") which leads to arc instability and interferes with operation, particularly in vertical-up and overhead welds. A range of about 12% to about 20 calcium carbonate, e.g., 15%, is preferred.

Barium carbonate is present in the range of about 5% to about 20% since it is found that when this ingredient is present in an amount less than about 5% the slag becomes too fluid during welding resulting in dripping of the molten slag in out-of-position welds. Concentrations in excess of about 20% increases the melting point of the slag with resultant fingernailing and are instability. Preferably, a range of about 12% to about 20% barium carbonate, e.g., 15%, is employed in the flux composition.

Titanium dioxide (rutile) serves primarily as an arc stabilizer and also reduces the melting point of the slag. In fluxes containing less than about 10% rutile, the melting point of the flux coating becomes too high, causing globular transfer. Also, at less than about 10% and above that 23$% rutile, the melting point of the slag increases causing the slag to become more tenacious and consequently more difficult to remove from the work. A range of about 12% to about 20% titanium oxide, e.g., 15%, is preferred.

A small amount of alumina, preferably about 1% to about 2%, is added to the flux coating to aid in slag removal. Without an alumina addition slag removal is acceptable; however, the addition of a small amount of alumina further improves this characteristic. If the amount of alumina is increased to about 4%, the melting point of the slag increases causing a fingernailing condition which adversely affects operation in out-of-position welding.

Cryolite within the amounts employed, serves as a cleansing agent in the slag and also lowers the melting point considerably. It has been found, however, that the cryolite must be maintained at a level from about 24% to about 26%. Amounts of cryolite either below 24% or above 26% increase the melting point of the flux coating which can result in melting of the core wire inside the coating; thereby causing interference with the weld pool and eventual extinguishment of the arc.

The thrust of this invention as set forth, particularly in relation to the cryolite range of 24% to 26% by weight of the dry flux, has been to provide an all-position welding electrode. In situations where a welding electrode operable for welding in the flat or horizontal positions is required, the flux composition can contain cryolite in the range of as little as 20% or as much as 30% since, in flat or horizontal welding, more power can be applied without encountering the difficulties in controlling the weld puddle which are found in out-of-position, e.g., vertical-up or overhead, welding. As is well known to those skilled in the art, substitutes for cryolite, either singly or in any proper combination, may also be employed, e.g., aluminum fluoride, the halides of the alkali metals and the alkaline earth metals, etc., for welds to be prepared in the flat and horizontal welding positions. However, such substitutions should not be made to fluxes intended for out-of-position welding as deterioration in operability can occur as shown hereinafter.

Manganese in amounts from about 10% to about 18% and columbium in amounts from about 1.8% (preferably at least 2.4% as noted above) to about 7.2%, are essential in the flux, in combination with the proportioned amount of other ingredients, to maintain the melting point of the flux so as to avoid fingernailing and globular transfer and to provide optimum weld soundness. For welding nickel-base alloys comprising nominally 28% chromium-10% iron, it is preferred that the flux contain about 13% to about 16% manganese and from about 4.8% to about 6% columbium. Manganese from about 4% to about 8% and columbium from about 1.8% to about 6% is preferred for the flux coating of welding electrodes to be employed in the welding of austenitic and ferritic steels to each other and to high nickel alloys. The manganese and columbium contents of the weld deposit are also increased thereby and serve to limit weld metal cracking. Manganese may be added in various forms, e.g., powder, ferro-manganese, etc., and columbium is preferably added as ferro-columbium (wherein the columbium content is from about 50% to about 70%) but may also be added as nickel-columbium or columbium powder or any other suitable form. As will be appreciated by those skilled in the art, supplemental additions of manganese and columbium could be achieved through the core wire to meet the requirements for cracking resistance in the weld.

Chromium in amounts up to about 10% is essential in the flux coating to minimize restrike and general porosity. The chromium in the coating also supplements the chromium transferred from the core wire so that for the welding of nickel-base alloys comprising nominally 28% chromium and 10% iron, a deposit containing about 27% to 28% chromium can be attained for optimum corrosion resistance. For electrodes contemplated herein, it has been found that at a chromium content of about 30%, e.g., 29.8%, in the core wire and with a chromium content of about 4% in the flux coating, a weld deposit containing about 28% chromium is provided.

Chromium oxide may be present in the flux composition in amounts up to about 2%. It has been found, as will be shown hereinbelow in Tables III and XI, that a small addition of chromium oxide to the flux, i.e., 1%, had varying effect on the operability of the electrodes contemplated in this invention. For example, for electrodes as shown hereinabove in Tables A and B, the chromium oxide had no noticeable effect on the electrodes operability, whereas, for electrodes as contemplated hereinabove in Tables C and D, a 1% chromium oxide addition improved arc stability. At 4% chromium oxide levels it was found however, that the penetrating characteristics of both these electrodes became excessive and burning-through the plate rather than welding of the plate resulted.

Molybdenum may be added to the flux coating in amounts up to about 7.2% to provide resistance to weld metal cracking. Molybdenum may also be added through the core wire. Molybdenum has been found to be especially beneficial in welding electrodes as described in Tables C and D and is preferred in accordance therewith at a level of about 1.8% to about 6%.

As will be appreciated by those skilled in the art, the flux coating of this invention can be applied to the core wire in any suitable manner, e.g., by an extrusion process, and dried on the wire surface by drying and/or baking. It has been found that satisfactory electrodes may be prepared by thoroughly dry mixing the flux ingredients and bentonite (consisting of fine powders about minus 80 or minus 100 mesh) in a suitable blending device, e.g., muller, for about 2 to 3 minutes. A sodium silicate water solution is then slowly added to the mixture and the blending continued until a homogenous mixture is obtained, usually about 3 to 5 minutes. In parts by weight of the dry flux, bentonite, at a level of about 3%, and sodium silicate (as a 47° Baume water solution) at a level of about 15%, is preferred. Bentonite is a colloidal clay and is commonly used as an extrusion aid in the manufacture of covered electrodes and the sodium silicate is commonly used as a binding agent to hold together the other mineral and metallic ingredients of the flux coating after extrusion and baking. A suitable drying and/or baking treatment comprises heating for 2 hours at 700° F. This procedure will result in a hard adherent coating of high mechanical strength that is relatively resistant to mechanical damage under normal handling conditions.

It has been found that operability is dependent on the electrode dimensions. Short circuiting in the overhead welding position may result, for example, if the flux coating is too thin. Examples of typical electrode dimensions and preferred current ranges are given hereinbelow in Table I.

TABLE I

| Core Wire Diameter (inches) | Electrode Diameter (Core + Flux), inches | Current Range (Amperes) |
|---|---|---|
| 3/32 | .145 – .155 | 40 – 65 |
| 1/8 | .200 – .210 | 65 – 95 |
| 5/32 | .235 – .245 | 95 – 125 |

As will be appreciated by those skilled in the art, it is permissible to vary these proportions and/or operating current to resolve specific welding problems. Thus, for example, in an overhead welding position, excessive slag fluidity may be minimized by reducing the amperage.

The compositions of the deposits and/or overlays will vary depending upon the exact composition of the flux, the type of core wire employed, and the compositions of the base metal being welded. The weld deposit is the result of correlating the core wire and coating compositions, and is affected by dilution of the base plate; however, in general, welding of a nickel-base alloy comprising nominally 28% chromium, 10% iron with preferred electrodes of this invention will produce weld deposits having compositions in the ranges shown in Table II, wherein the compositions are expressed in percent by weight.

TABLE II

| Element | Broad Range | Preferred Range |
|---|---|---|
| Nickel | 50 – 67 | 52 – 65 |
| Iron | UT 25 | 8 – 12 |
| Chromium | 24 – 32 | 27 – 31 |
| Manganese | 1 – 8 | 3 – 5 |
| Titanium | UT 0.7 | UT 0.2 |
| Columbium | 0.5 – 3 | 1 – 2 |
| Silicon | UT 0.8 | 0.2 – 0.6 |
| Carbon | UT 0.1 | UT 0.05 |
| Aluminum | UT 1.1 | UT 0.1 |
| Magnesium | UT 0.1 | UT 0.02 |

UT = Up To

Preferred electrodes according to the compositions and proportions contemplated herein produce sound weld deposits having a combination of mechanical and corrosion resistant properties comparable to those of a base plate of a high nickel alloy comprising nominally 28% chromium and 10% iron. To achieve the optimum corrosion resistance in the weld deposit, the carbon content of the weld deposit should be maintained below about 0.05%, and preferably, at about 0.03% and the chromium content should be at least about 26% or 27% and preferably, about 28%. To limit weld metal cracking, the weld deposit should contain columbium at about 0.5%, preferably about 1%, and manganese at about 1%, and preferably about 3%.

For the purpose of giving those skilled in the art a better understanding of the invention, the following illustrative examples are given.

EXAMPLE I

To demonstrate the excellent operability of electrodes of this invention, various flux compositions, shown hereinbelow in Table III, were used to coat ⅛-inch diameter core wire containing 0.021% carbon, 0.16% manganese, less than 0.02% silicon, 29.8% chromium, 0.29% aluminum, 0.14% titanium, 0.014% magnesium, 8.6% iron, and the balance essentially nickel. Flux Nos. 1 to 18 are within the invention and Flux Nos. A-G are outside the scope of this invention. The manganese and chromium were added as electrolytic powder, and the columbium as ferrocolumbium containing 60% columbium. Where added, nickel was added as electrolytic powder, and the zirconium oxide and chromium oxide as welding grade powders. The electrodes were prepared by extrusion using, in percent by weight of the dry flux, 3% bentonite and 15% sodium silicate (47° Baume solution). The thus constituted electrode was then baked at 550° F. for 2 hours. A ½-inch thick grooved metal plate of the same material as the core wire was welded in the overhead position with a single pass. The plate had a 60° V-bevel which extended to a depth of ⅜-inch, the base of the V-bevel being 3/16-inch wide. This configuration simulates the geometry found in the second weld pass of a 60° V-bevelled joint. All welds were conducted at 85 amperes DCRP (Direct Current Reversed Polarity) using the same rectified power source. As will be appreciated by those skilled in the art, this weld is considered to be the most difficult pass in the multipass weld.

Operability tests showed that the fluxes of the invention were commercially operable whereas the fluxes outside the invention were not. Fluxes A, C, and F, for example, had a tendency to fingernail and Flux C produced a bead with a high crown and the slag was difficult to remove from the edges of the bead. Flux No. 11 exhibited the best overall operability. It offered excellent arc stability at both long and short arc lengths, and has no tendency to short circuit or fingernail. Flux removal was accomplished easily with a hammer and chisel and there was residue on the bead or plate surface and thus no need for special preparation, e.g., grinding, prior to a second pass. The bead was uniform with good blending to side walls and the contour was acceptable in that it was almost flat in crosssection with only slight convexity.

TABLE III

| Flux No. | Coating O.D., in. | Flux Composition, Weight Percent | | | | | | | | |
|---|---|---|---|---|---|---|---|---|---|---|
| | | $CaCO_3$ | $BaCO_3$ | $TiO_2$ | $Al_2O_3$ | $Na_3AlF_6$ | Mn | FeCb | Cr | Other |
| 1 | 0.190 | 16 | 14 | 17 | 3 | 25 | 15 | 10 | 0 | — |
| 2 | 0.190 | 16 | 14 | 17 | 0 | 25 | 15 | 10 | 3 | — |
| 3 | 0.200 | 16 | 14 | 17 | 1 | 25 | 15 | 10 | 4 | — |
| 4 | 0.200 | 16 | 14 | 17 | 1 | 25 | 15 | 10 | 4 | — |
| 5 | 0.200 | 16 | 14 | 17 | 0 | 25 | 15 | 10 | 4 | — |
| 6 | 0.200 | 16 | 14 | 17 | 3 | 25 | 15 | 10 | 4 | — |
| 7 | 0.210 | 16 | 14 | 17 | 1 | 25 | 15 | 10 | 4 | — |
| 8 | 0.210 | 16 | 14 | 17 | 3 | 25 | 15 | 10 | 4 | — |
| 9 | 0.210 | 12 | 16 | 17 | 1 | 25 | 15 | 10 | 4 | — |
| 10 | 0.210 | 21 | 8 | 16 | 1 | 25 | 15 | 10 | 4 | — |
| 11 | 0.210 | 15 | 15 | 15 | 1 | 25 | 15 | 10 | 4 | — |
| 12 | 0.210 | 18 | 13 | 14 | 1 | 25 | 15 | 10 | 4 | — |
| 13 | 0.210 | 12 | 14 | 19 | 1 | 25 | 15 | 10 | 4 | — |
| 14 | 0.210 | 18 | 10 | 17 | 1 | 25 | 15 | 10 | 4 | — |
| 15 | 0.210 | 16 | 16 | 16 | 1 | 25 | 12 | 10 | 4 | — |
| 16 | 0.210 | 14 | 14 | 13 | 1 | 25 | 15 | 10 | 8 | — |
| 17 | 0.210 | 14 | 17 | 13 | 1 | 25 | 15 | 10 | 5 | — |
| 18 | 0.210 | 15 | 15 | 14 | 1 | 25 | 15 | 10 | 4 | 1 $Cr_2O_3$ |
| A | 0.200 | 16 | 14 | 17 | 1 | 25 | 20 | 10 | 4 | — |
| B | 0.210 | 12 | 12 | 11 | 1 | 25 | 15 | 10 | 4 | 10 Ni |
| C | 0.210 | 16 | 16 | 15 | 1 | 23 | 15 | 10 | 4 | — |
| D | 0.210 | 13 | 14 | 13 | 1 | 25 | 15 | 10 | 5 | 4 $ZrO_2$ |
| E | 0.210 | 14 | 14 | 13 | 1 | 25 | 15 | 10 | 5 | 4 $Cr_2O_3$ |
| F | 0.210 | 13 | 12 | 12 | 1 | 25 | 15 | 10 | 12 | — |
| G | 0.210 | 12 | 12 | 15 | 1 | 25 | 15 | 15 | 4 | — |

O.D., in. = Outside Diameter, inch

EXAMPLE II

To demonstrate the ability of the electrodes of this invention to provide sound weld deposits having strength and corrosion resistance equivalent to that of a base plate nominally containing 28% chromium, 10% iron, balance essentially nickel, various electrodes within and outside the invention were prepared as shown hereinabove in Example 1. Table IV shows the compositions of various alloys used as the core wire and/or the base plate and Table V shows the composition and dimensions of the finished electrodes. Reference should be made to Table III shown hereinabove for the compositions of the flux coatings. Details of the various welds prepared are shown in Table VI together with the results of tests which illustrate the ability of the electrode to provide sound weld deposits. Table VII shows the compositions of these welds and their tensile properties. Except as otherwise indicated, the "Flat" position shown in Table VI consisted of welding a single U-groove (15° Bevel, ¼ inch radius, 3/32 inch root face and ⅛ inch root opening) weld. The "Overhead" position consisted of a ½ inch thick butt weld (60° V-butt joint) in which the first pass was made in the flat position. The welded joints were radiographically examined, cut into transverse slices (about 6 or 7 slices per welded joint) polished, etched with Lepito's reagent and microscopically examined for defects at 10X. The Bend tests were performed by bending two ⅜ inch thick transverse slices from each weld 180° about 1½ inch diameter pin. One Bend test specimen was in the as-welded condition and the other was heated for 20 hours at 1300° F. and air-cooled (A.C.); this heat treatment is specified in NAVSHIPS 250-1500-1 (Standard for Welding Reactor Coolant and Associated Systems and Components for Naval Nuclear Power Plants (Pressurized, Water Cooled Systems), Bureau of Ships, Navy Dept. Washington, D.C.)). The Bend test specimens were then examined for defects at 10X. The "No. of Cracks/Section" values in Table VI represent an average for the specimens testes.

TABLE IV

| Alloy No. | \multicolumn{10}{c}{Composition in Weight Percent, Balance Ni} |
|---|---|---|---|---|---|---|---|---|---|---|
| | C | Mn | Si | Cr | Al | Ti | Mg | Fe | O | N |
| 1 | 0.067 | 0.25 | 0.21 | 28.9 | 0.08 | 0.31 | 0.02 | 10.9 | — | — |
| 2 | 0.021 | 0.16 | 0.02 | 29.8 | 0.29 | 0.14 | 0.014 | 8.6 | 0.0039 | 0.0635 |
| 3 | 0.005 | 0.07 | 0.06 | 28.8 | 0.17 | 0.24 | 0.020 | 10.4 | 0.0063 | 0.0017 |
| 4 | 0.18 | 0.41 | 0.10 | — | 0.060 | — | — | * | — | — |
| 5 | 0.051 | 0.16 | 0.19 | 28.3 | 0.84 | 0.48 | 0.023 | 10.2 | 0.0034 | 0.0023 |
| 6 | 0.019 | 0.29 | 0.29 | 29.0 | 0.036 | 0.11 | 0.058 | 10.3 | 0.0180 | 0.0280 |

*Balance iron

TABLE V

| Electrode No. | Core Wire - Alloy No. | Flux No. | Diameter (inch) Core Wire | Diameter (inch) Core + Flux |
|---|---|---|---|---|
| 1 | 1 | 1 | 5/32 | 0.220 |
| 2 | 1 | 2 | 5/32 | 0.220 |
| 3 | 2 | 4 | 5/32 | 0.240 |
| 4 | 2 | 4 | 1/8 | 0.200 |
| 5 | 2 | 4 | 3/32 | 0.150 |
| 6 | 2 | 5 | 5/32 | 0.240 |
| 7 | 2 | 6 | 5/32 | 0.240 |
| 8 | 2 | 11 | 5/32 | 0.240 |
| 9 | 2 | 15 | 5/32 | 0.240 |
| 10 | 3 | 17 | 5/32 | 0.240 |
| A | 2 | A | 5/32 | 0.240 |
| B | 2 | G | 5/32 | 0.240 |

TABLE VI

| Weld No. | Electrode No. | Position | Joint Thickness, Inch | Plate (Alloy No.) | No. of Passes | Radiographic Inspection | No. of Cracks/Section Polished Slices | Bend Test As-Welded | Bend Test Aged 20 Hrs./1300° F./A.C. |
|---|---|---|---|---|---|---|---|---|---|
| 1 | 1 | Flat | 1 | 2 | 20 | N.D. | .09 | 2.0 | 1.0 |
| 2 | 2 | Flat | 1 | 2 | 20 | N.D. | .30 | 1.0 | 1.0 |
| 3 | 3 | Flat | 1 | 2 | 30 | N.D. | .38 | 0 | 0 |
| 3A | 3 | Flat | 1/2 (1) | 4 | 10 | N.T. | 0 | N.T. | 0 |
| 4 | 4 | Overhead | 1/2 | 2 | 9 | 3 Pores <1/32" diameter in 6" | 0 | 0 | 0 |
| 5 | 5 | Pipe (2) | 1/4 | 5 | 6 | 3 Pores <1/16" diameter | 0 | 0 | 0 |
| 6 | 6 | Flat | 1 | (3) | 21 | N.D. | .15 | 0 | 1.5 |

TABLE VI-continued

| Weld No. | Electrode No. | Position | Joint Thickness, Inch | Plate (Alloy No.) | No. of Passes | Radiographic Inspection | No. of Cracks/Section Polished Slices | Bend Test As-Welded | Bend Test Aged 20 Hrs./ 1300° F./A.C. |
|---|---|---|---|---|---|---|---|---|---|
| 7 | 7 | Flat | 1 | 6 | 21 | N.D. | .30 | 0.5 | 0.5 |
| 8 | 8 | Flat | 1 | 2 | 21 | N.D. | .2 | 0 | 0 |
| 9 | 9 | Flat | 1 | 2 | 16 | N.D. | .3 | 0 | 0 |
| 10 | 10 | Flat | 1 | 2 | 21 | N.D. | 0 | 0 | 1.0 |
| A | A | Flat | 1 | 6 | 21 | N.D. | .08 | 0 | 0 |
| B | B | Flat | 1 | 2 | 20 | N.D. | 1.9 | N.T. | N.T. |

(1) Overlay on 1/2" × 4" × 6" mild steel plate (Alloy No. 4) 10 passes wide and 1 bead high.
(2) Fixed position pipe weld. 2 5/8" Inside Diameter, 3 1/8" Outside Diameter, Alloy No. 2, 45°Bevel, 1/16" root face, first pass GTA (Gas Tungsten Arc) with Alloy No. 5 filler.
(3) Dissimilar joint, Alloy No. 6 to mild steel Alloy No. 4.
N.D. = No Defects
N.T. = Not Tested

TABLE VII

| Weld No. | Composition in Weight Percent, Balance Ni | | | | | | | | | | Tensile Properties | | | | Fracture Location |
| | C | Mn | Si | Cr | Al | Ti | Mg | Fe | Cb | O | N | 0.2% Y.S. (ksi) | U.T.S. (ksi) | Elong. (1"),% | R.A. % | |
|---|---|---|---|---|---|---|---|---|---|---|---|---|---|---|---|---|
| 1 | .062 | 3.5 | .35 | 26.2 | .04 | .120 | .003 | 13.6 | 1.56 | .070 | .068 | 66.7 | 103.0 | 28.5 | 45.5 | Weld |
| 2 | .052 | 3.0 | .33 | 28.0 | .03 | .083 | .008 | 10.9 | 1.20 | .071 | .067 | N.T. | N.T. | N.T. | N.T. | |
| 3 | .036 | 4.3 | .29 | 27.3 | .08 | .120 | .006 | 8.8 | 1.70 | .081 | .082 | N.T. | N.T. | N.T. | N.T. | |
| 4 | .042 | 4.9 | .27 | 28.2 | .04 | .062 | .006 | 9.2 | 2.00 | .072 | .082 | 56.2 | 103.1 | 35.5 | 43.2 | Weld |
| 6 | .041 | 4.1 | .33 | 27.2 | .03 | .060 | .008 | 10.3 | 1.60 | .084 | .075 | N.T. | N.T. | N.T. | N.T. | |
| 7 | .037 | 4.2 | .34 | 27.4 | .04 | .080 | .008 | 9.1 | 1.80 | .079 | 0.077 | N.T. | N.T. | N.T. | N.T. | |
| 8 | .035 | 4.8 | .33 | 27.5 | .026 | .062 | .01 | 9.1 | 1.8 | 0.79 | .081 | 66.0 | 99.6 | 22.0 | 40.2 | Weld |
| 9 | .039 | 3.8 | .31 | 27.6 | .14 | .076 | .013 | 9.2 | 1.5 | .082 | .075 | 65.6 | 101.7 | 25.0 | 36.0 | Weld |
| 10 | .027 | 4.8 | .37 | 27.3 | .050 | .080 | .006 | 10.6 | 1.9 | .084 | .037 | 61.0 | 94.7 | 26.0 | 36.8 | Weld |
| 1 | .040 | 5.5 | .34 | 26.8 | .05 | .100 | .008 | 9.1 | 1.60 | .082 | .074 | 52.0 | 95.4 | 39.5 | 69.8 | Base |
| B | .037 | 4.8 | .41 | 27.7 | .084 | .150 | .006 | 9.5 | 3.1 | .074 | .082 | N.T. | N.T. | N.T. | N.T. | |
| * | | | | | | | | | | | | 54.0 | 106.0 | 42.0 | 60.0 | |

0.2% Y.S. (ksi) = Yield Strength at 0.2% offset (kilopounds/inch²)
U.T.S. = Ultimate Tensile Strength
Elong. (1"), % = % Elongation in 1"
R.A. = Reduction in Area
* = Alloy No. 2
N.T. = Not Tested The results as shown in Table VI clearly indicate that sound weld deposits are produced by electrodes of this invention. Welds Nos. 4 and 5 show that out-of-position welds may be made with only minimal porosity. Welds Nos. 3A and 6 demonstrate that the electrode has the tolerance for iron dilution that is necessary for overlaying steel and for making dissimilar joints. The tolerance for iron dilution is an important characteristic of electrodes of this invention since it enables steel to be clad with a more corrosion resistant alloy and the making of dissimilar joints which are commonly encountered in the construction of vessels, etc., where structural support is needed. Although Weld No. A made with Electrode A was sound, the behavior of the electrode was unsatisfactory in that fingernailing was experienced which caused a high crowned weld deposit. Weld No. B, also made with an electrode outside the invention, was not radiographically sound, the slag was difficult to remove and the bead deposit was high crowned rather than flat.

Table VIII shows the results of standard Huey corrosion tests performed on Welds Nos. 1, 2, 7 and 10 (in the as-welded condition). The Huey tests were performed in accordance with the procedures outlined in recommended practice C of ASTM A-262 by exposing, to a boiling 65% nitric acid environment for 48 hour periods, weld sections comprising base plate and weld deposit. After each period the samples were tested for their resistance to corrosion by measuring the weight loss in milligrams/square decimeter/day (mdd). As discussed hereinabove, it was found that the corrosion resistance of the weld deposit is affected by the carbon and chromium contents. Too high a carbon content, coupled with a low chromium content, leads to excessive corrosion attach, and is deemed undesirable for many applications where excellent resistance to corrosion is required. Weld No. 1, for example, was produced with a core wire having a carbon content of 0.067% and a chromium content of 28.9%, no chromium was employed in the flux. This produced a carbon content in the weld deposit of 0.062% and a chromium content of 26.2% and led to an undesirably high corrosion rate. Weld No. 2, was made from an electrode having the same core wire as the electrode used for Weld No. 1 but contained 3% chromium in the flux; the weld deposit contained 0.052% carbon and 28% chromium and had a significantly lower corrosion rate than Weld No. 1. As those skilled in the art will appreciate, the difference in carbon levels (0.062% and 0.052%) of weld deposits produced by electrodes having the same core wire may be due to many factors, such as segregation in the core wire; however, to achieve a weld deposit having a corrosion resistance equivalent to that of the base alloy, Welds Nos. 7 and 10 show the benefit derived from employing electrodes having core wires with a carbon content of only 0.021% and 0.005%, respectively. The chromimum and carbon contents represent preferred levels in the weld deposits and the corrosion rates are significantly lower than Welds Nos. 1 and 2, and compare favorably with the wrought base plate material. No preferential attack of weld or heat-affected zone was noted in any of these samples.

Huey tests indicated that sensitization of the weld deposits results with a 4 hour heat treatment at 1100° F. followed by air cooling. Heating of the weld deposit for 20 hours at 1300° F. and air cooling as specified in NAVSHIPS 250-1500-1 (discussed hereinabove), had no detrimental affect however on the corrosion resistance as measured by the Huey test.

TABLE VIII

| Weld No. | Partial Deposit Composition, Weight Percent | | | Corrosion Rate in Boiling 65% HNO₃, Milligrams/Square Decimeter/Day After Indicated Number of 48 Hour Periods* | | | | |
|---|---|---|---|---|---|---|---|---|
| | C | Cr | Cb | 1 | 2 | 3 | 4 | 5 |
| 1 | .062 | 2.62 | 1.56 | 66 | 179 | 392 | 1018 | 619 |
| 2 | .052 | 28.0 | 1.2 | 24 | 63 | | | |
| 7 | .037 | 27.4 | 1.8 | 18 | 18 | 20 | | |
| 10 | .027 | 27.3 | 1.9 | 19 | 12 | 12 | | |

*A corrosion rate of 20-30 mdd is normally observed for the wrought nickel-base 28% chromium - 10% iron alloy.

EXAMPLE III

To determine the effect of columbium as an ingredient in the flux composition, a series of electrodes, Electrode Nos. 11-14, were prepared with varying columbium compositions in the flux coating. Core wire 5/32 inch diameter was coated to an outside diameter of 0.240 inch with, in percent by weight of dry flux, 15% calcium carbonate, 15% barium carbonate, 15% titanium dioxide, 25% cryolite, 1% aluminum oxide, 15% manganese, and 4% chromium. The flux coating for Electrode No. 14 was similar in composition except that the barium carbonate was 14% and the titanium dioxide was 14%. The remainder of the flux contained nickel powder and ferrocolumbium (60% columbium) as shown hereinbelow in Table IX.

The core wire comprised, by weight, 0.021% carbon, 1.16% manganese, 8.6% iron, 0.02% silicon, 29.8% chromium, 0.29% aluminum, 0.14% titanium, 0.014% magnesium and the balance essentially nickel. The electrodes were prepared with 3% bentonite and 15% sodium silicate, 47° Baume solution, as shown hereinbefore in Example I. The electrodes were used to buttweld base plate consisting of, nominally by weight, 0.031% carbon, 0.14% manganese, 9.6% iron, 0.06& silicon, 30.8% chromium, 0.15% aluminum, 0.16% titanium, 0.018% magnesium and the balance essentially nickel. The weld was in the flat position and the plate was 1 inch thick and had a 15° U-bevel, 3/32 inch root face, ¼ inch radius and ⅛ inch root opening. The weld was completed in 18 passes and removal of the flux between passes was easily accomplished with hammer and chisel. Tests were performed as described hereinabove in Example II and the results of the tests, as shown hereinbelow in Table X, clearly demonstrate the beneficial effect of columbium on the crack-resistance of the resulting weld.

TABLE IX

| Electrode No. | Ni | FeCb |
|---|---|---|
| 11 | 10 | 0 |
| 12 | 6 | 4 |
| 13 | 2 | 8 |
| 14 | 0 | 12 |

TABLE X

| Weld No. | Electrode No. | Radiographic Inspection | Number of Cracks/Section | | |
|---|---|---|---|---|---|
| | | | Polished Slices | Bend Test | |
| | | | | AS-Welded | Aged 20 hrs./ 1300° F./A.C. |
| 11 | 11 | N.T. | 6.5 | N.T. | N.T. |
| 12 | 12 | N.D. | .29 | 2.5 | 3.5 |
| 13 | 13 | N.D. | 0.07 | 0 | 0 |
| 14 | 14 | N.D. | 0 | 0.5 | 2.0 |

N.T. = Not Tested
N.D. = No Defects

EXAMPLE IV

To demonstrate the ability of the flux composition of the invention to be used with other alloy core wires, an electrode was prepared with a core wire comprising, nominally by weight, 0.03% carbon, 2.2% manganese, 8% iron, 0.1% silicon, 16% chromium, 0.1% aluminum, 3% titanium, and the balance essentially nickel. The core wire was 5/32 inch diameter and was coated to an outside diameter of 0.240 inch with, in percent by weight of the dry flux, 17% calcium carbonate, 16% barium carbonate, 16% titanium dioxide, 25% cryolite, 1% aluminum oxide, 15% manganese and 10% ferrocolumbium (60% columbium). The electrode was prepared with 3% bentonite and 15% sodium silicate, 47° Baume solution as shown hereinbefore in Example I. The electrode was used to but-weld INCONEL alloy 600 base plate consisting of, nominally by weight, 0.04% carbon, 0.20% manganese, 7.2% iron, 0.20% silicon, 15.8% chromium, and the balance essentially nickel. The weld was in the flat position and the plate was 1-3/16 inch thick and had a 15° U-bevel, 3/32 inch root face, ¼ inch radius and ⅛ inch root opening.

* = T.M.

The 1-3/16 inch thick weld was completed in 20 passes. Removal of the flux between passes was easily accomplished with a hammer and chisel. Tests performed as described hereinabove in Example II show the weld to be radiographically sound, transverse slices were free from defects and as-welded and aged Bend Test specimens were also free from cracking.

EXAMPLE V

To further demonstrate the ability of the flux composition of the invention to be used for other alloy welding applications, a ⅛-inch core wire of the same composition as in Example IV was coated to an outside diameter of 0.200 inch with, in per cent by weight of the dry flux, 16% calcium carbonate, 14% barium carbonate, 17% titanium dioxide, 25% cryolite, 1% aluminum oxide, 15% manganese, and 10% ferrocolumbium (60% columbium). The electrode was prepared as in accordance with Example IV. An overhead butt weld was made in a ½-inch plate of the same material welded in Example IV, and was completed in 9 passes. The plate had a 60° V-bevel, ⅛-inch root opening and 3/32-inch root face. Tests were performed as described hereinabove in Example II. Radiographic inspection showed freedom from porosity with only 2 pores, less than 1/32-inch in diameter, in a 6 inch length. Transverse slices and as-welded and aged Bend Test specimens were free from cracking.

EXAMPLE VI

In order to demonstrate the tolerance for iron dilution exhibited by electrodes of this invention, an electrode identical to that prepared in Example V, except that the core wire was 5/32-inch and the outside diameter was 0.240 inch, was prepared. A single layer pass weld overlay 10 passes wide was made on ½-inch thick, mild steel plate having a nominal composition of 0.2% carbon, 0.4% manganese and the balance iron. Tests were performed in accordance with the procedures outlined in Example II, excpet that the Bend Test was performed on a 1 inch diameter pin. Radiographic inspection showed no defects and transverse slices and Bend Test specimens were also free from defects.

EXAMPLE VII

To further demonstrate the excellent operability of electrodes of this invention, various flux compositions, shown hereinbelow in Table XI, were used to coat 1/8-inch diameter core wire, the compositions of which are shown hereinbelow in Table XII. Also shown in Table XII are the compositions of alloys used in welding tests described hereinbelow. Table XIII shows the composition of the completed electrodes. The electrodes were prepared in accordance with Example I.

TABLE XI

| Flux No. | Flux Composition, Weight Percent |||||||||| 
|---|---|---|---|---|---|---|---|---|---|---|
| | $CaCO_3$ | $BaCO_3$ | $TiO_2$ | $Al_2O_3$ | $NaAlf_6$ | Mn | FeCb | Cr | $Cr_2O_3$ | FeMo |
| 19 | 16 | 16 | 16 | 1 | 25 | 9 | 10 | 0 | 1 | 6 |
| 20 | 17 | 16 | 16 | 1 | 25 | 7 | 9 | 3 | 1 | 5 |
| 21 | 17 | 16 | 16 | 1 | 25 | 7 | 9 | 3 | 1 | 5 |

TABLE XII

| Alloy No. | Composition in Weight Percent |||||||||||| 
|---|---|---|---|---|---|---|---|---|---|---|---|---|
| | C | Mn | Si | Cr | Al | Ti | Mg | Fe | Cu | Ta | Cb | Ni |
| 7 | .031 | .32 | .22 | 16.4 | .057 | .35 | .035 | 7.6 | .04 | .50 | 1.08 | Bal |
| 8 | .022 | .18 | .26 | 16.4 | .055 | .32 | .030 | 7.1 | .02 | .60 | 1.29 | Bal |
| 9 | .12 | .54 | .32 | — | — | — | — | Bal | — | — | — | 8.9 |
| 10 | .022 | 1.25 | .34 | 19.5 | <.01 | <.05 | — | Bal | — | — | — | 10.2 |
| 11 | .03 | .86 | .33 | 20.9 | .36 | .44 | — | Bal | — | — | — | 31.8 |
| 12 | .05 | .12 | .21 | 16.1 | .1 | .22 | 0.02 | 6.6 | — | — | — | Bal |
| 13 | .003 | .65 | .07 | — | — | .49 | — | .46 | Bal | — | — | 30.5 |
| 14 | .05 | .88 | .39 | 20.9 | — | — | — | Bal | — | — | — | 30.4 |

TABLE XII-continued

| Alloy No.: | C : | Mn : | Si : | Cr : | Composition in Weight Percent Al : | Ti : | Mg : | Fe : | Cu : | Ta : | Cb : | Ni |
|---|---|---|---|---|---|---|---|---|---|---|---|---|
| 15 : | .18 : | .41: | <.1: | — : | 0.06 : | — : | — : | Bal: | — : | — : | — : | — |

TABLE XIII

| Electrode | Core Wire - Alloy No. | Flux No. |
|---|---|---|
| 11 | 7 | 19 |
| 12 | 7 | 20 |
| 13 | 8 | 21 |

Operability tests in accordance with Example I, the ½ inch plate being prepared from Alloy No. 14, were performed in the flat, vertical-up and overhead positions. The electrodes were found to be commercially operable, and comparison with a commercial welding electrode showed the electrodes of the invention to have a more stable arc, less spatter (expulsion of molten metal from the arc) improved slag fluidity, finer transfer size, considerably better final bead appearance and improved ease of slag removal. Additionally, radiographic tests for the overhead position welds showed greater than 50 pores/inch in the single bead deposit for the commercial electrode and virtually no pores for the electrode of this invention.

EXAMPLE VIII

To demonstrate the ability of electrodes of this invention to weld similar and dissimilar alloys, various plate materials, shown hereinabove in Table XII, were welded. The weld details and result of tests are shown hereinbelow in Table XV. The "flat" position shown in Table XV consisted of welding a single U-groove (15° bevel, ¼ inch radius, 3/32 inch root face and ⅛ inch root opening) weld. The "Overhead" position consisted of a ⅜ inch thick butt weld (60° V-butt joint) in which the first pass was made in the flat position. Eight passes were required to fill the 60° V-butt joint and intentional restrikes (weld bead interrupted and a fresh electrode started) were made in each pass. Radiographic examination and Bend Tests were conducted as described in Example II.

TABLE XIV

| Weld No. | Electrode No. | Position | Joint Thickness, inch | Plate 1 (Alloy No.) | Plate 2 (Alloy No.) | Radiographic Inspection | No. of Cracks/Section Polished Slices | Bend Test As-Welded | Aged 20 hrs./ 1300° F./A.C. |
|---|---|---|---|---|---|---|---|---|---|
| 15 | 11 | Flat | 1 | 9 | 10 | N.D. | 0 | 0 | 0 |
| 16 | 13 | Flat | 1 | 11 | 11 | N.T. | 0 | 2(<1/64″) | 1(<1/64″) |
| 17 | 12 | Overhead | 3/8 | 12 | 12 | 1 pore <1/32″ dia. | 0 | 0 | 0 |
| 18 | 13 | Flat | 1/2 | 13 | 14 | N.T. | 0 | 0 | 1 (1) |
| 19 | 13 | Flat | 1/2 | 9 | 9 | N.T. | 0 | 1 (2) | 1 (2) |
| 20 | 13 | Flat | 1 | 15 (3) | — | N.T. | 0 | 3(<1/64″) | — |

N.D. = No Defects
N.T. = Not Tested
(1) = Small cracks in fusion line in Plate 1
(2) = All yielding occurred in weld deposit causing weld failure in as-welded specimen and fusion line failure in aged specimen
(3) = Two-pass high overlay on 1″ × 5″ × 5″ mild steel plate (Alloy No. 15)

TABLE XV

| Weld No.: | 0.2% Y.S., (ksi): | U.T.S., (ksi): | Elong., (1″): %: | R.A.: %: | Fracture Location: | Condition: | Charpy V-Notch at −320° F Toughness, Ft-lbs: | Lateral Expansion, mils |
|---|---|---|---|---|---|---|---|---|
| 16 : | 48.9: | 80.6 : | 27.5 : | 71.2: | Plate : | — : | N.T. : | N.T. |
| 18 : | 45.0: | 71.5 : | 18.5 : | 51.2: | Plate : | — : | N.T. : | N.T. |
| 19 : | 63.0: | 99.4 : | 14.5 : | 38.0: | Weld : | As-Welded: | 65 : | 56 |
|  |  |  |  |  |  | Aged 2 hrs/ 1050° F/AC : | 74 : | 67 |

EXAMPLE IX

The flux identified as Flux No. H conforming in composition to that specified in U.S. Pat. No. 3,024,137, was extruded as a 0.220 inch diameter coating on 25 rods, 5/32 inch diameter, of the 28% Cr, 10% Fe, balance Ni wire identified as Alloy No. 2 to illustrate the need for a special flux coating for use with the 28% Cr, 10% Fe, balance Ni core wire. The flux coating had the composition shown in Table XVI below.

up welding position. Also, the slag was too fluid and the electrode had an excessive burn-off rate.

TABLE XVI

| Flux No. | Composition in Weight Percent | | | | | | | |
|---|---|---|---|---|---|---|---|---|
| | CaCO$_3$ | NaAlF$_6$ | TiO$_2$ | MnCO$_3$ | Mn | FeCb | Bentonite | Na$_2$SiO$_3$ |
| H | 18 | 18 | 18 | 18 | 15 | 10 | 3 | 15 |

Coating dia.-.220", 5/32" dia. Ni, 28% Cr, 10% Fe alloy core wire (alloy No. 2 in Table IV).

A one inch thick weld was prepared in the flat-position with these covered electrodes. During the welding operation, the electrode was subject to instability with occasional extinguishing of the arc resulting from an unfavorable melting condition in which the molten flux flowed over the tip of the core wire. Considerable difficulty was experienced concerning removal of the solidified slag. It was necessary to use an abrasive grinder to remove the slag rather than the considerably easier conventional chipping method.

From the foregoing, it is seen that the addition of calcium fluoride or the substitution in part of calcium fluoride for cryolite is not desirable in this flux system, since this action results in deterioration of operational characteristics in out-of-position welds.

EXAMPLE XI

Tests were also conducted to determine the effect of using carbonates such as MgCO$_3$ and SrCO$_3$ in the absence or together with BaCO$_3$ in flux coatings otherwise corresponding to the flux coating of this invention as described in Table XVIII below.

TABLE XVIII

| Flux No. | Composition in Weight Percent | | | | | | | | | |
|---|---|---|---|---|---|---|---|---|---|---|
| | CaCO$_3$ | BaCO$_3$ | MgCO$_3$ | SrCO$_3$ | TiO$_2$ | Al$_2$O$_3$ | Na$_3$AlF$_6$ | Mn | FeCb | Cr |
| L | 15 | 0 | 15 | 0 | 15 | 1 | 25 | 15 | 10 | 4 |
| M | 15 | 5 | 10 | 0 | 15 | 1 | 25 | 15 | 10 | 4 |
| N | 15 | 0 | 0 | 15 | 15 | 1 | 25 | 15 | 10 | 4 |
| O | 15 | 5 | 0 | 10 | 15 | 1 | 25 | 15 | 10 | 4 | coating dia.-.200", ⅛" dia. Ni, 28% Cr, 10% Fe alloy core wire (alloy No. 2 in Table IV)

EXAMPLE X

Several fluxes were prepared which contained calcium fluoride supplementing the cryolite addition as well as substituting for this addition, the compositions of the flux coatings otherwise corresponding to the flux coating of this invention. While as noted above, calcium fluoride may be substituted in fluxes used for welds made in the flat-position, it has an adverse effect in out-of-position welds. In this connection, the fluxes used to coat the 28% Cr, 10% Fe, balance Ni core wire had the compositions shown in Table XVII below.

Flux Nos. L and M, prepared with magnesium carbonate substituted completely or in part for the barium carbonate constituent of the flux, required an addition of almost 9% water, rather than the normal 1% or 2% addition, to render the coatings sufficiently plastic for extrusion. This large water requirement reflects the low bulk density of magnesium carbonate. The coatings could be extruded but, began to harden inside the extruder. The inside chamber of the extruder was found to be relatively dry showing that the ingredients were

TABLE XVII

| Flux No. | Composition in Weight Percent | | | | | | | | |
|---|---|---|---|---|---|---|---|---|---|
| | CaCO$_3$ | BaCO$_3$ | TiO$_2$ | Al$_2$O$_3$ | Na$_3$AlF$_6$ | Mn | FeCb | Cr | CaF$_2$ |
| I | 16 | 14 | 17 | 1 | 25 | 15 | 10 | 4 | 2 |
| J | 16 | 14 | 17 | 1 | 25 | 15 | 10 | 4 | 2 |
| K | 16 | 14 | 17 | 1 | 15 | 15 | 10 | 4 | 10 | coating dia.-.200", ⅛" dia. Ni, 28% Cr, 10% Fe alloy core wire (alloy No. 2 in Table IV)

Using bead-on-plate tests, both of these electrodes exhibited satisfactory welding characteristics in the flatposition; however, the operability was unacceptable in the vertical-up and overhead positions, notwithstanding the presence of 25% cryolite. The covered electrodes were characterized by globular transfer, a molten slag that was excessively fluid and a too rapid burn-off rate.

Flux No. K, which contained 10% calcium fluoride substituted for 10% of the cryolite, was tested using the bead-on-plate technique. This electrode had generally good operational characteristics in the flat-position; however, globular transfer was observed in the verticalchemically reacting. Severe craze-cracks were found in the coatings of each extruded piece after baking for 2 hours at 700° F. The coatings were extremely fragile and tended to fall apart during handling.

The operability of selected covered electrodes having the flux coatings identified as flux Nos. L and M was examined in the flat-position. The best-appearing extruded sections of these magnesium carbonate-containing covered electrodes exhibited excessive spatter, balling at the end of the electrode, a poor cup-shape, and total coverage of the weld puddle by molten slag so that it was impossible for the welder to view the molten metal of the weld pool. This latter undesirable condition caused intermittent extinguishing of the arc. The solidified slag was extremely difficult to separate from the weld deposit. In addition, a heavy residue was left behind upon the surface of the weld deposits which could not be removed by a normal chipping procedure. Due to the totally unacceptable operating and slag removal characteristics, no further tests were conducted with these covered electrodes.

Covered electrodes prepared with Flux Nos. N and O containing strontium carbonate substituted completely and partially for the barium carbonate constituent were blended and extruded without difficulty. The coatings were of good quality and free from cracking after baking for 2 hours at 700° F.

The strontium carbonate containing electrodes offered fair operability at best in the flat-position, although the arc was considered to be unstable and exhibited a short-circuiting tendency at close arc lengths despite a favorable cup geometry. The molten slag was found to be sluggish and covered the weld pool thereby preventing the welder from viewing the weld pool, which, as mentioned previously, is a highly undesirable condition. Slag removal was characterized as difficult since the slag required substantial effort to remove. Once the slag was removed from the weld deposit, it was found that the weld bead prepared with flux No. N was clean; however, the bead prepared with Flux No. O, which contained strontium carbonate substituted in part for barium carbonate, had a heavy surface residue which was difficult to remove.

Bead-on-plate weld deposits were prepared with the strontium carbonate-containing fluxes in the vertical-up and overhead positions. The operability in the vertical-up position was fair for electrodes prepared with Flux No. N, which exhibited a desirable cup-shape and poor for electrodes prepared with Flux No. O which had a poor cup-shape accompanied by balling of the slag about the tip of the electrode.

The solidified slag was difficult to remove from both weld deposits. The difficulty in removal was attributed in part to undesirable high-crowned beads which acted to key the slag along the edges of the weld deposit. The solidified slag was not sufficiently friable to be removed from the edges of the weld deposit by chipping and consequently required the use of a power wire brush for this purpose. Furthermore, the weld bead prepared with Flux No. O had a black surface residue that could only be removed by grinding.

In the overhead welding position, the operability of the two strontium carbonate-containing covered electrodes was poor. Although the covered electrode prepared with Flux No. N exhibited a good cup-shape and the covered electrode prepared with Flux No. O did not, they both exhibited a tendency to short-circuit which led to sticking of the covered electrodes to the metal plate. The amount of spatter obtained with Flux No. O was extremely excessive and in this regard differed from Flux No. N. When a weaving motion was imparted to either covered electrode, the puddle, immediately closed up and the welding arc was extinguished. The only means by which a weld deposit of any length could be obtained in the overhead position was through the use of a stringer bead technique, i.e., a method involving rapid, straightline movement without oscillation. Although stringer beads have some usefulness, they are not entirely desirable, especially in overhead weld deposits, since, it is necessary for a welder to be able to weave the tip of the electrode slightly, so that both walls of a welded joint are fused to the weld deposit, thereby avoiding unsoundness in the form of slag inclusions and/or voids.

Covered electrodes such as those prepared with Flux Nos. L through O, in which other alkaline earth metal carbonates are substituted totally or in part for barium carbonate show totally unacceptable welding characteristics when used to prepare out-of-position welds such as those in the vertical-up and overhead positions.

The present invention is particularly applicable for the welding of nickel-chromium-iron alloys in all positions with freedom from cracking and porosity. The electrodes are also particularly suitable for welding higher alloys, e.g., nickel-chromium-iron alloys, to steel or other lower alloys and for overlaying such materials onto steel in all positions. The electrodes of this invention are extremely versatile and allow the use of arc-welding techniques in all applications where assurance of top quality is of the utmost importance. It is also within the scope of this invention to employ electrodes having flux cores or comprised of powdered compacts within a thin metallic sheath so long as the composition of the weld deposits falls within the ranges tabulated in Table II.

The flux compositions contemplated herein in addition to being particularly applicable for the welding of nickel-chromium-iron alloys are also effective for the welding of nickel-chromium and nickel-copper alloys when a core wire containing, by weight, up to about 50% chromium, up to about 35% or even about 70% iron, up to about 90% copper, up to about 5% titanium, up to about 15% manganese, up to 0.5% or even about 1% carbon, up to about 3% silicon, up to about 10% molybdenum, up to about 2% aluminum, up to about 6% columbium, and the balance essentially nickel.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A flux composition adapted to provide all-position covered electrode welding capability consisting essentially of, in weight percent from about 10% to about 26% calcium carbonate, from about 5% to about 20% barium carbonate, from about 10% to about 23% titanium dioxide, up to about 4% aluminum oxide, from about 24% to about 26% cryolite, from about 10% to about 18% manganese, from about 1.8% to about 7.2% columbium, and chromium present in an amount up to about 10%.

2. A flux composition in accordance with claim 1 which comprises from about 12% to about 20% calcium carbonate, from about 12% to about 20% barium carbonate, from about 12% to about 20% titanium dioxide, from about 1% to about 2% aluminum oxide, from about 24% to about 26% cryolite, from about 13% to about 16% manganese, from about 4.8% to about 6% columbium, and chromium present in an amount up to about 6%.

3. A flux composition in accordance with claim 2 wherein the ratio of calcium carbonate to barium carbonate to titanium dioxide is about 1:1:1.

4. An all-position welding electrode having a core wire containing, by weight, up to about 1% carbon, up to about 15% manganese, up to about 50% chromium, up to about 5% titanium, up to about 2% aluminum, up to about 70% iron, up to about 90% copper, up to about 10% molybdenum, up to about 6% columbium and the balance essentially nickel, and a flux coating consisting essentially of, in parts by weight of the dry flux, about 10 to about 26 parts calcium carbonate, about 5 to about 20 parts barium carbonate, about 10 to about 23 parts titanium dioxide, up to about 4 parts aluminum oxide, from about 24 to about 26 parts cryolite, about 10 to about 18 parts manganese, about 2.4 to about 7.2 parts columbium and up to about 10 parts chromium.

5. An all-position welding electrode having a core wire containing, by weight, up to about 0.1% carbon, up to about 2% manganese, up to about 2.5% silicon, about 24% to about 32% chromium, up to about 5% titanium, up to about 5% aluminum, up to about 25% iron, and the balance, in an amount from about 50% to about 67% essentially nickel, and a flux coating consisting essentially of, in parts by weight of the dry flux, about 10 to about 26 parts calcium carbonate, about 5 to about 20 parts barium carbonate, about 10 to about 23 parts titanium dioxide, up to about 4 parts aluminum oxide, from about 24 to about 26 parts cryolite, about 10 to about 18 parts manganese, about 2.4 to about 7.2 parts columbium and up to about 10 parts chromium.

6. An all-position welding electrode in accordance with claim 5 wherein the flux composition comprises about 12 to about 20 parts calcium carbonate, about 12 to about 20 parts barium carbonate, about 12 to about 20 parts titanium dioxide, about 1 to about 2 parts aluminum oxide, about 24 to about 26 parts cryolite, about 13 to about 16 parts manganese, about 4.8 to about 6 parts columbium, and up to about 6 parts chromium.

7. An all-position welding electrode in accordance with claim 5 wherein the core wire contains, by weight, up to about 0.05% carbon, up to about 1% manganese, up to about 1% silicon, from about 27% to about 31% chromium, up to about 1% aluminum, up to about 1% titanium, from about 8% to about 12% iron, and the balance, in an amount from about 52% to about 65%, essentially nickel.

8. An all-position welding electrode in accordance with claim 5 yielding upon welding a nickel-base alloy comprising nominally 28% chromium, 10% iron, a weld deposits containing, by weight, up to about 0.1% carbon, up to about 8% manganese, up to about 0.8% silicon, about 24% to about 32% chromium, up to about 1.1% aluminum, up to about 0.7% titanium, up to about 25% iron, and the balance, in an amount about 50% to about 67%, essentially nickel.

9. An all-position welding electrode in accordance with claim 8 yielding upon welding a nickel-base alloy comprising nominally 28% chromium, 10% iron, weld deposits containing, by weight, up to about 0.05% carbon, about 3% to about 5% manganese, about 0.2% to about 0.6% silicon, about 27% to about 31% chromium, up to about 0.1% aluminum, up to about 0.2% titanium, about 8% to about 12% iron, and the balance, in an amount about 52% to about 65%, essentially nickel.

10. A flux composition adapted to provide covered electrode welding capability consisting essentially of, in weight percent from about 10% to about 26% calcium carbonate, from about 5% to about 20% barium carbonate, from about 10% to about 23% titanium dioxide, up to about 4% aluminum oxide, from about 20% to about 30% cryolite, from about 4% to about 18% manganese, from about 2.4% to about 7.2% columbium, and chromium present in an amount up to about 10%.

11. A flux composition adapted to provide covered electrode welding capability containing, in weight percent from about 10% to about 26% calcium carbonate, from about 5% to about 20% barium carbonate, from about 10% to about 23% titanium dioxide, up to about 4% aluminum oxide, from about 20% to about 30% cryolite, from about 10% to about 18% manganese, from about 1.8% to about 7.2% columbium, chromium present in an amount up to about 10%, up to about 2% chromium oxide, with the proviso that the sum of said chromium oxide and said aluminum oxide is less than 3%, and up to about 7.2% molybdenum.

12. A flux composition adapted to provide all-position covered electrode welding capability in accordance with claim 11, wherein the cryolite is from about 24% to about 26%.

13. A flux composition in accordance with claim 11, which comprises from about 12% to about 20% calcium carbonate, from about 12% to about 20% barium carbonate, from about 12% to about 20% titanium dioxide, from about 1% to about 2% aluminum oxide, from about 24% to about 26% cryolite, from about 4% to about 9 manganese, from about 2.4% to about 6% columbium, from about 1% to about 6% chromium, from about 1% to about 2% chromium oxide with the proviso that the sum of said chromium oxide and said aluminum oxide is less than 3%, and from about 1.8% to about 6% molybdenum.

14. An all-position welding electrode having a core wire containing, by weight, up to about 1% carbon, up to about 15% manganese, up to about 50% chromium, up to about 5% titanium, up to about 2% aluminum, up to about 70% iron, up to about 90% copper, up to about 10% molybdenum, up to about 6% columbium, up to about 3% silicon, and the balance essentially nickel, and a flux coating consisting essentially of, in parts by weight of the dry flux, about 10 to about 26 parts calcium carbonate, about 5 to about 20 parts barium carbonate, about 10 to about 23 parts titanium dioxide, up to about 4 parts aluminum oxide, about 24 to about 26 parts cryolite, about 4 to about 18 parts manganese, about 1.8 to about 7.2 parts columbium, up to about 10 parts chromium, up to about 2 parts chromium oxide, and up to about 7.2 parts molybdenum.

15. An all-position welding electrode having a core wire containing, by weight, up to about 0.1% carbon, up to about 2.5% manganese, about 14% to about 18% chromium, up to about 5% titanium up to about 5% aluminum, up to about 25% iron, up to about 2.5% silicon, up to about 2% columbium, up to about 1% tantalum the sum of columbium and tantalum being about 1.5 to about 3%, and the balance essentially nickel, and a flux coating consisting essentially of, in parts by weight of the dry flux, about 10 to about 26 parts calcium carbonate, about 5 to about 25 barium carbonate, about 10 to about 23 parts titanium dioxide, up to about 4 parts aluminum oxide, about 24 to about 26 parts cryolite, about 4 to about 18 parts manganese, about 1.8 to about 7.2 parts columbium, up to about 10 parts chromium, up to about 2 parts chromium oxide, and up to about 7.2 parts molybdenum.

16. An all-position welding electrode in accordance with claim 14, wherein the flux composition comprises about 12 to about 20 parts calcium carbonate, about 12 to about 20 parts barium carbonate, about 12 to about 20 parts titanium dioxide, about 1 to about 2 parts aluminum oxide, about 24 to about 26 parts cryolite, about 4 to about 9 parts manganese, about 1.8 to about 6 parts columbium, about 1 to about 6 parts chromium, about 1 to about 2 parts chromium oxide and about 1.8 to about 6 parts molybdenum.

17. An all-position welding electrode in accordance with claim 15, wherein the core wire contains, by weight, up to about 0.05% carbon, up to about 1% manganese, about 15% to about 17% chromium, up to about 1% titanium, up to about 1% aluminum, from about 6% to about 8% iron, up to about 1% silicon, up to about 1.5% columbium, up to about 0.5% tantalum, the sum of the columbium and tantalum being about 1.5% to about 3%, and the balance essentially nickel.

* * * * *